United States Patent [19]
Rohlf

[11] Patent Number: 6,070,308
[45] Date of Patent: Jun. 6, 2000

[54] DOUBLE LOCKING SNAP HOOK

[75] Inventor: Bradley A. Rohlf, Red Wing, Minn.

[73] Assignee: D B Industries, Inc., Red Wing, Minn.

[21] Appl. No.: 09/177,409

[22] Filed: Oct. 23, 1998

[51] Int. Cl.[7] .......................... A44B 13/00; F16B 45/02
[52] U.S. Cl. ........................................ 24/600.8; 24/600.4
[58] Field of Search .............................. 24/600.8, 600.4, 24/600.5, 600.3, 599.3, 598.3, 600.1, 600.2; 294/82.2, 82.19

[56] References Cited

U.S. PATENT DOCUMENTS

| | | |
|---|---|---|
| 705,526 | 7/1902 | Gray . |
| 741,014 | 10/1903 | Covert ..................... 24/600.8 |
| 761,859 | 6/1904 | Sweet ...................... 24/600.8 |
| 1,062,653 | 5/1913 | Koons ...................... 24/600.8 |
| 1,228,513 | 6/1917 | Anderson ................. 24/600.8 |
| 1,394,068 | 10/1921 | Cousins . |
| 1,521,811 | 1/1925 | Hartbauer ................ 24/600.8 |
| 1,546,208 | 7/1925 | Cunningham . |
| 1,583,347 | 5/1926 | Frischknecht ........... 24/600.8 |
| 1,598,684 | 9/1926 | Jensen ..................... 24/600.8 |
| 1,687,006 | 10/1928 | Cornelius . |
| 2,490,931 | 12/1949 | Thompson ............... 24/241 |
| 2,577,790 | 12/1951 | McCormick ............. 24/600.8 |
| 3,575,458 | 4/1971 | Crook, Jr. et al. ........ 294/82 |
| 4,122,585 | 10/1978 | Sharp et al. ............. 24/241 |
| 4,279,062 | 7/1981 | Boissonnet .............. 24/305 |
| 4,528,729 | 7/1985 | Schmidt et al. .......... 24/241 |
| 4,977,647 | 12/1990 | Casebolt ................. 24/599.5 |
| 5,257,441 | 11/1993 | Barlow ................... 24/599.5 |

*Primary Examiner*—James R. Brittain
*Assistant Examiner*—Robert J. Sandy
*Attorney, Agent, or Firm*—Mau & Krull, P.A.

[57] ABSTRACT

The base of a snap hook includes handle portion and a hook portion. A bolt is movably mounted to the handle portion and is biased to move axially into a locked position relative to the hook portion. A latch is movably mounted to the handle portion and is biased to move transversely into engagement with the bolt when the bolt occupies the locked position relative to the hook portion.

37 Claims, 4 Drawing Sheets

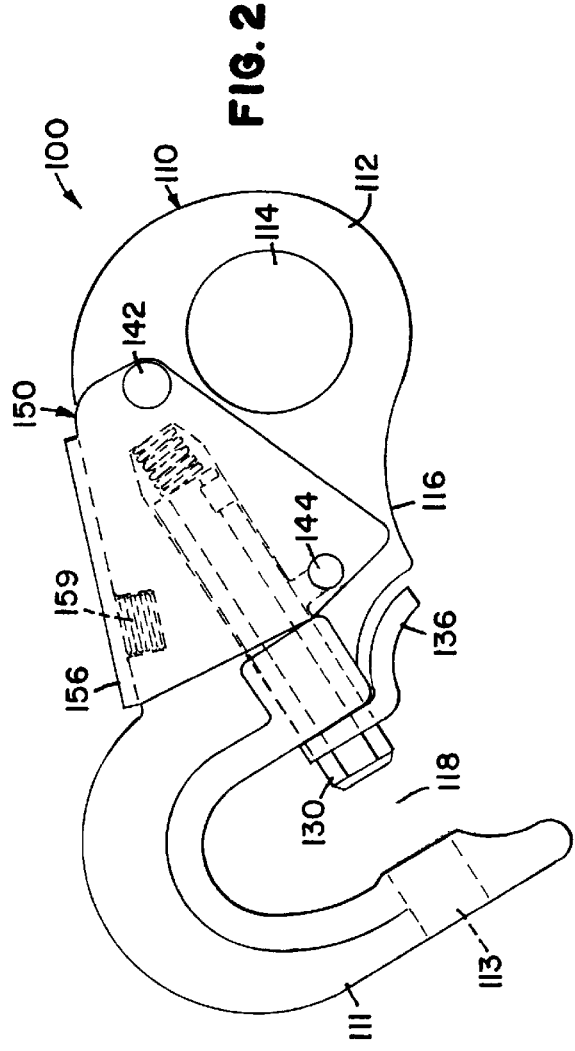
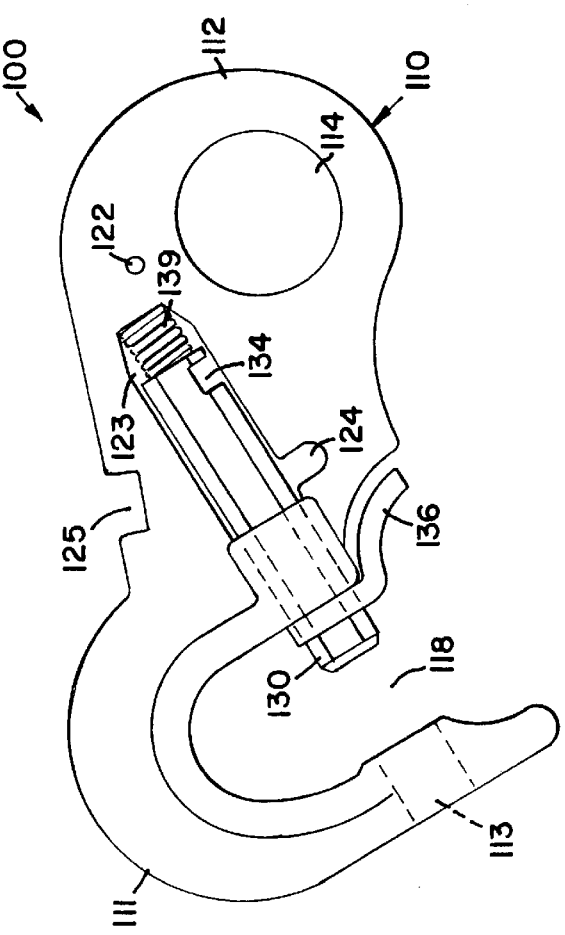
FIG. 2
FIG. 3

DOUBLE LOCKING SNAP HOOK

FIELD OF THE INVENTION

The present invention relates to methods and apparatus for connecting a line relative to a load or a person.

BACKGROUND OF THE INVENTION

Some examples of prior art snap hooks are disclosed in U.S. Pat. No. 1,546,208 to Cunningham; U.S. Pat. No. 2,490,931 to Thompson; U.S. Pat. No. 3,575,458 to Crook, Jr.; U.S. Pat. No. 4,122,585 to Sharp et al.; and U.S. Pat. No. 5,257,441 to Barlow. In general, these devices serve their intended purpose, but the possibility of mishap remains if they are used contrary to recommended operating procedures. In particular, typical safety hooks are supposed to have their respective closed loop ends secured to a line, and their respective hook ends secured to another object. When used in this manner, tension in the line sets the solid portion of the hook firmly against the support structure, and the gate portion of the hook is not required to carry the load on the line.

Sometimes, however, users of the hooks are inclined to wrap the line about the support structure and then connect the hook to an intermediate portion of the line. This deviation from recommended operating procedure may cause the line to bear against the gate portion of the hook and/or may cause the gate portion of the hook to bear against the support structure. Under such circumstances, a fall arrest event may impart excessive force on the gate portion result in failure of the hook. In view of this possibility, an object of the present invention is to provide a double locking snap hook having a load bearing gate which is capable of withstanding forces associated with the arrest of a person's fall.

SUMMARY OF THE INVENTION

The present invention provides a double locking snap hook having a load bearing gate. On a preferred embodiment of the present invention, a bolt moves axially into and out of a closed position relative to an opening defined by a hook. A spring biases the bolt toward the closed position. A pin is movable into engagement with a notch in the bolt when the latter occupies the closed position. A spring biases the pin toward the bolt. The resulting connector is convenient to use and reliable in use. Additional features and/or advantages of the present invention may become more apparent from the detailed description which follows.

BRIEF DESCRIPTION OF THE DRAWING

With reference to the Figures of the Drawing, wherein like numerals represent like parts and assemblies throughout the several views.

FIG. 2 is a side view of the snap hook of FIG. 1 with both springs compressed as much as possible;

FIG. 3 is a side view of the snap hook of FIG. 1 with certain components removed to reveal additional details.

DETAILED DESCRIPTION OF THE PREFERRED EMBODIMENT

Figure 1:
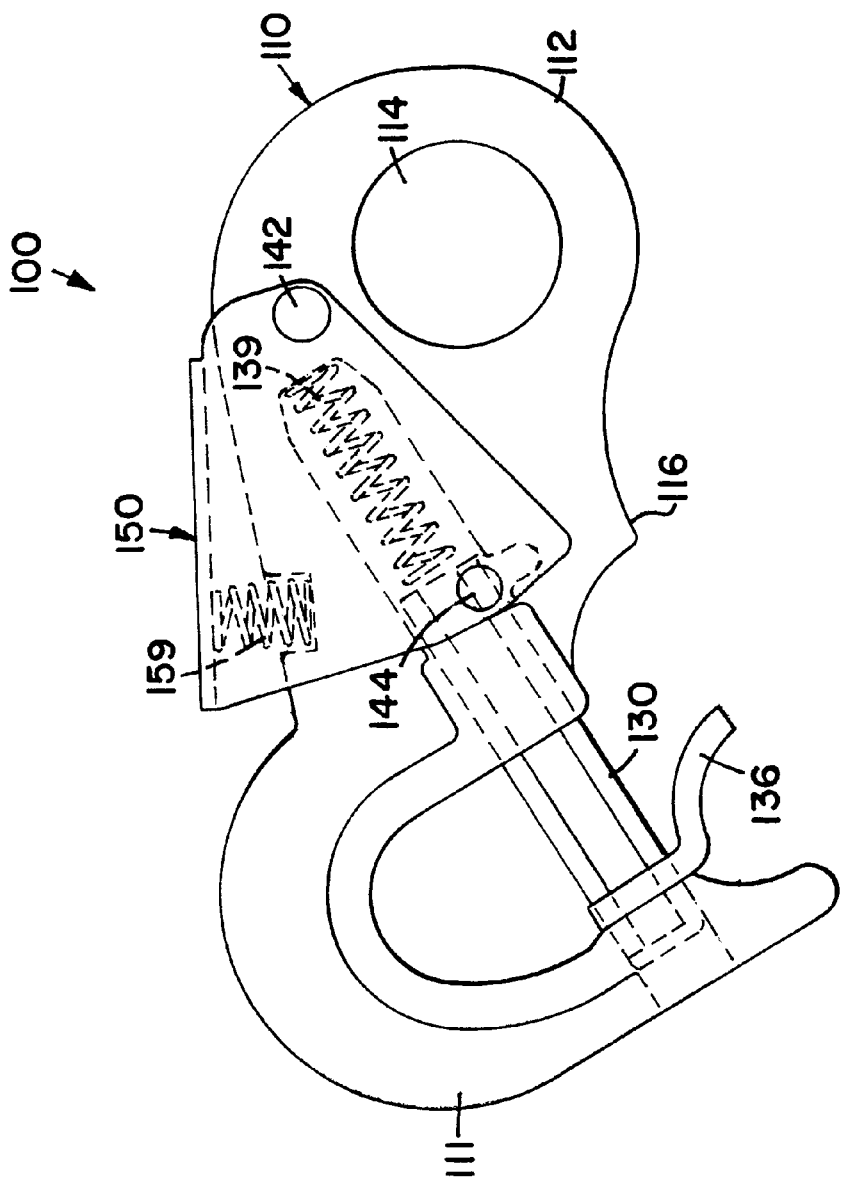
FIG. 1 is a side view of a snap hook constructed according to the principles of the present invention.

A preferred embodiment snap hook constructed according to the principles of the present invention is designated as 100 in FIGS. 1–3. The hook 100 generally includes a base 110, a gate 130, and a latch 150. The base 110 includes a hook portion 111 and a handle portion 112. The hook portion 111 is U-shaped and defines an opening 118. The handle portion 112 is configured for grasping and includes an contoured grip portion 116. Also, a hole 114 extends through the handle portion 112 to facilitate connection of the hook 100 to any of various elements, including a support structure, a lanyard, or a fall-arrest device, for example. Those skilled in the art will recognize that the hook 100 may be used for a variety of purposes and/or in a variety of situations. For example, U.S. Pat. No. 5,687,535 to Rohlf, U.S. Pat. No. 5,174,410 to Casebolt, and U.S. Pat. No. 4,657,110 to Wolner show some possible applications for the hook 100.

As shown in FIG. 3, a slot 123 is provided ir the handle portion 112 to accommodate a helical coil spring 139 and a portion of the gate 130 (which may also be described as a bolt). Also, an opening 113 is provided in the far end of the hook portion 111 to accommodate a distal end of the bolt 130. The bolt 130 has a longitudinal axis, and the slot 123 constrains the bolt 130 to move axially relative to the base 110. The spring 139 is axially aligned with the bolt 130 and compressed between the bolt 130 and the end wall of the slot 123. The spring 139 biases the bolt 130 outward from the slot 123, across the opening 118, and into the opening 113. In this regard, the spring 139 may be described as a means for biasing the bolt 130 toward a closed position relative to the hook portion 111. A force receiving member 136 is rigidly secured to an intermediate portion of the bolt 130, proximate the distal end, to facilitate user movement of the bolt 130 against the force of the spring 139.

As shown in FIG. 3, a hole 122 is provided in the handle portion 112 to receive a rivet 142 which pivotally mounts a force receiving portion 156 of the latch 150 to the handle portion 112. The latch 150 also includes a rivet 144 extending through the pivoting member 156, and a helical coil spring 159 compressed between the pivoting member 156 and a notch 125 in the handle portion 112. The spring 159 biases the pivoting member 156 away from the base 110 and thereby biases the rivet or pin 144 toward the bolt 130. As shown in FIG. 3, the pin 144 moves within a slot 124 in the handle portion 112 and engages a notch 134 in the bolt 130 when the latter occupies a closed position relative to the hook portion 111. The sidewalls of the pivoting member 156 cover opposite sides of the slots 123–125 and thereby assist in retaining the springs 139 and 159 in place. The spring 159, the pin 144, and the pivoting member 156 may be described as a means for selectively preventing movement of the bolt 130 out of the closed position relative to the hook portion 111.

To operate the hook 100, a person must first squeeze the pivoting member 156 against the handle portion 112 to move the pin 144 out of engagement with the bolt 130, and then, push or pull the force receiving member 136 to move the bolt 130 out of engagement with the far end of the hook portion 111 (to arrive at the configuration shown in FIG. 2). After a desired member is inserted into the opening 118 defined by the hook portion 111, release of the hook 100 will first result in the bolt 130 moving back through the opening 113, and then, will result in the pin 144 moving back into engagement with the notch 134.

Contrary to conventional snap hooks, the structural integrity of the gate 130 on the present invention is comparable to that of the hook portion 111. Accordingly, the snap hook 100 is better suited for connection to an intermediate portion of a cable having an end secured through the hole 114 in the handle portion 112.

Figure 4:
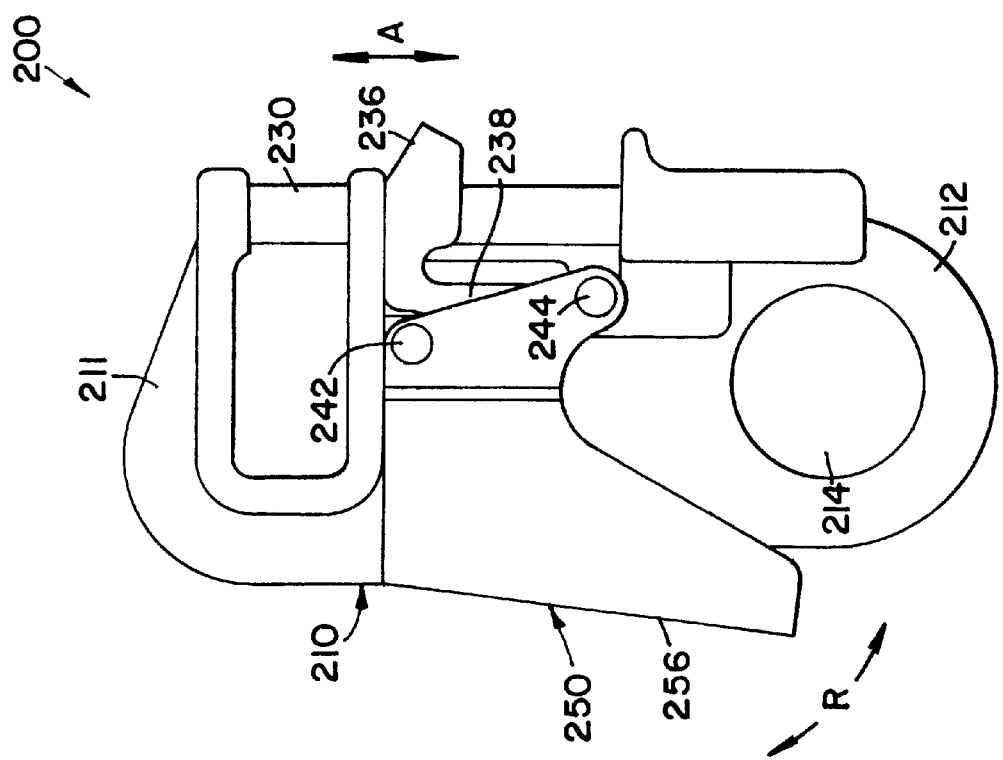
FIG. 4 is a side view of an alternative embodiment snap hook constructed according to the principles of the present invention.

An alternative embodiment of the present invention is designated as 200 in FIG. 4. The snap hook 200 similarly includes a base 210, a gate 230, and a latch 250. The gate 230 moves axially (indicated by arrows A) relative to a handle portion 212 of the base 210 and into engagement with a far end of a hook portion 211 of the base 210. A spring (not shown) biases the gate 230 toward the far end of the hook portion 211. A member is rigidly secured to an intermediate portion of the gate 230 and provides both a force receiving member 236 (to facilitate movement of the gate 230 by a user) and a latch engaging member 238 (to prevent inadvertent movement of the gate 230).

The latch 250 includes a pivoting member 256 connected to the handle portion 212 by means of a rivet 242, and a second rivet 244 which is rigidly secured to the pivoting member 256 and crosses paths with the latch engaging member 238. The pivoting member 256 pivots about the rivet 242 (indicated by arrows R) relative to a handle portion 212 of the base 210. A spring (not shown) biases the rivet 244 toward the latch engaging member 238.

When the hook 200 is configured as shown in FIG. 4, the rivet 244 prevents movement of the gate 230 out of the locked position relative to the hook portion 211. The hook 200 may be opened by squeezing the pivoting member 256 toward the handle portion 212, and subsequently moving the force receiving member 236 away from the hook portion 211.

Figure 6:
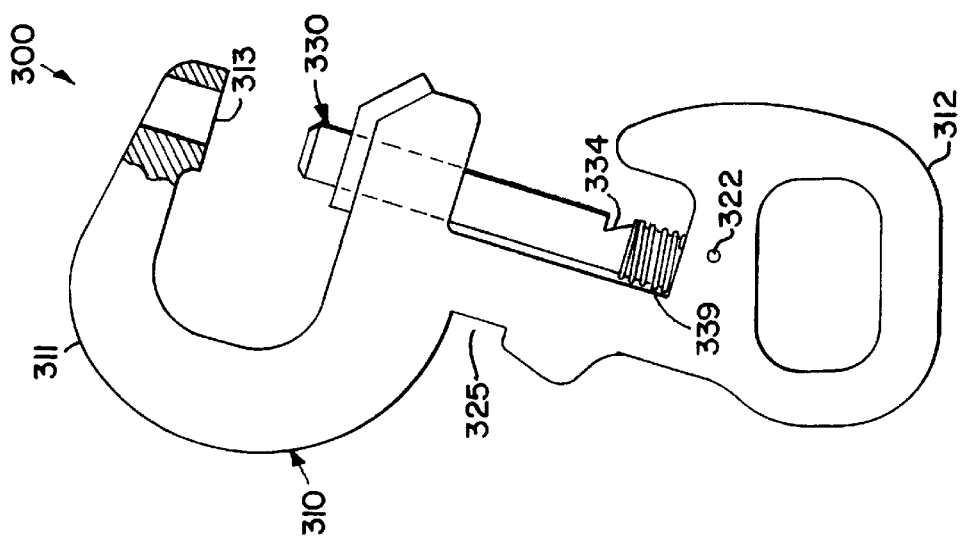
FIG. 6 is a side view of the snap hook of FIG. 5 with certain parts removed to reveal additional details.
Figure 5:
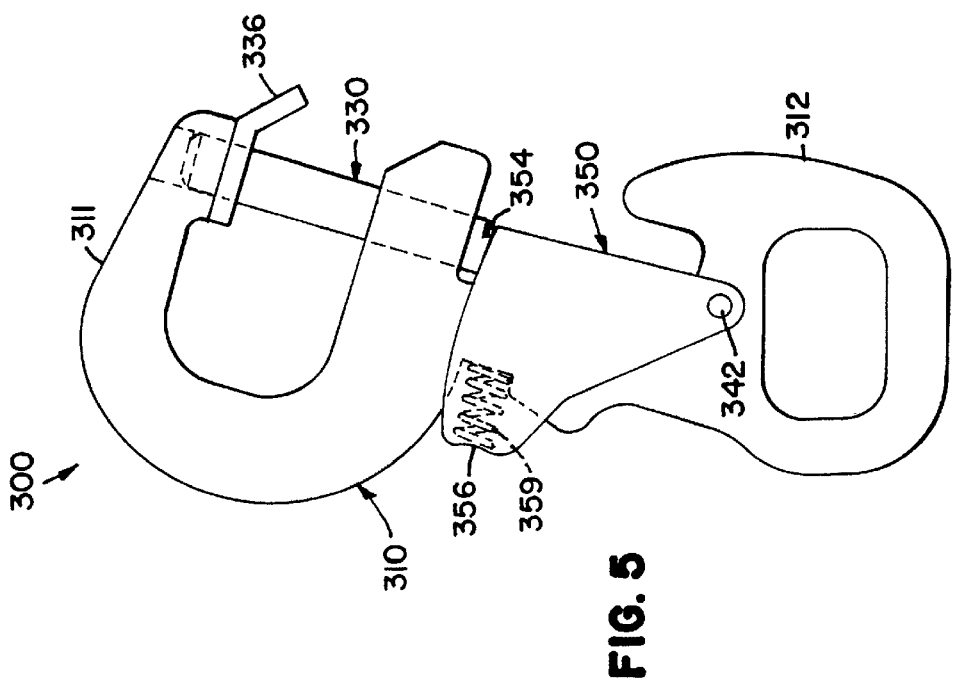
FIG. 5 is a side view of yet another snap hook constructed according to the principles of the present invention.

Another alternative embodiment is designated as 300 in FIGS. 5–6. FIG. 5 is a side view of the snap hook 300, and FIG. 6 is a side view of the snap hook 300 with certain components removed to reveal additional details. The snap hook 300 similarly includes a base 310, a gate 330, and a latch 350. The gate 330 moves axially relative to a handle portion 312 of the base 310 and into engagement with a far end of a hook portion 311 of the base 310. A spring 339 biases the gate 330 toward the far end of the hook portion 311. A force receiving member 336 is rigidly secured to an intermediate portion of the gate 330 to facilitate movement of the gate 330 by a user).

The latch 350 includes a pivoting member 356 connected to the handle portion 312 by means of a rivet 342 extending through a hole 322. The pivoting member 356 pivots about the rivet 342 relative to the handle portion 312 of the base 310. An edge 354 of the pivoting member 356 engages a notch 334 in the gate 334 when the latter occupies a closed position relative to the hook portion 311. A spring 359 is compressed between the pivoting member 356 and a notch 325 in the handle portion 312 to bias the edge 354 into engagement with toward the gate 330.

When the hook 300 is configured as shown in FIG. 5, the edge 354 prevents movement of the gate 330 out of the locked position relative to the hook portion 311. The hook 300 may be opened by squeezing the pivoting member 356 toward the handle portion 312 (against the bias of the spring 359), and subsequently moving the force receiving member 336 away from the hook portion 311 (against the bias of the spring 339).

Although the present invention has been described with reference to specific embodiments and particular applications, this disclosure will enable those skilled in the art to recognize additional embodiments and/or applications which fall within the scope of the present invention. Accordingly, the scope of the present invention should be limited only to the extent of the following claims.

What is claimed is:

1. A snap hook, comprising:

a base including a handle portion and a hook portion;

a bolt having a longitudinal axis and movably mounted to said handle portion;

a first spring, interconnected between said bolt and said handle portion, and operable to urge said bolt axially outward from said handle portion, across a gap defined by said hook portion, and into an opening in a far end of said hook portion;

a latch movably mounted to said handle portion, wherein said latch has side walls disposed on opposite sides of said handle portion; and a second spring, disposed entirely between said side walls on said latch, interconnected between said latch and said handle portion, and operable to urge said latch into engagement with said bolt when said bolt occupies said opening in said far end of said hook portion, whereby a user must overcome forces exerted by said second spring and said first spring in order to remove said bolt from said far end of said hook.

2. The snap hook of claim 1, wherein said bolt is disposed within a slot in said handle portion and between opposite side walls of said latch.

3. The snap hook of claim 1, further comprising a force receiving member rigidly secured to said bolt.

4. The snap hook of claim 1, wherein said first spring is a helical coil spring axially aligned with said bolt and compressed between said bolt and said handle portion.

5. The snap hook of claim 1, wherein said latch is rotatably mounted on said handle portion.

6. The snap hook of claim 5, wherein said second spring is a helical coil spring extending generally perpendicular to said longitudinal axis and compressed between said latch and said handle portion.

7. The snap hook of claim 1, wherein said second spring is a helical coil spring extending generally perpendicular to said longitudinal axis and compressed between said latch and said handle portion.

8. A snap hook, comprising:

a base including a handle portion and a hock portion;

a bolt having a longitudinal axis and movably mounted within a first opening in said handle portion;

a first spring, interconnected between said bolt and said handle portion, and operable to urge said bolt axially along said first opening, outward from said handle portion, across a gap defined by said hook portion, and into an aligned opening in a far end of said hook portion;

a latch movably mounted to said handle portion, wherein said latch includes a pin which extends transverse to said longitudinal axis and is movable along a second opening in said handle portion, wherein said second opening extends generally transversely into said first opening, and said pin is movable across a juncture defined between said first opening and said second opening; and a second spring, interconnected between said latch and said handle portion, and operable to urge said pin along said second opening, through the juncture, and into a notch in said bolt when said bolt occupies said aligned opening in said far end of said hook portion, whereby a user must overcome forces exerted by said second spring and said first spring in order to remove said bolt from said far end of said hook.

9. The snap hook of claim 8, wherein said first spring is a helical coil spring axially aligned with said bolt and compressed between said bolt and said handle portion.

10. The snap hook of claim 8, wherein said first opening extends laterally through at least one side of said handle portion, and said latch covers said first opening on said one side of said handle portion.

11. The snap hook of claim 8, wherein said second opening extends laterally through at least one side of said handle portion, and said latch covers said second opening on said one side of said handle portion.

12. The snap hook of claim 8, wherein said second spring is a helical coil spring extending generally perpendicular to said longitudinal axis and compressed between said latch and said handle portion.

13. The snap hook of claim 8, wherein said pin is disposed at a first end of said latch, and an opposite, second end of said latch is rotatably connected to said handle portion.

14. The snap hook of claim 13, wherein an intermediate portion of said latch, rigidly interconnected between said first end and said second end, is configured to receive a user applied force.

15. A snap hook, comprising:
    a base including a handle portion and a hook portion;
    a bolt having a longitudinal axis and movably mounted within a first opening in said handle portion;
    a first means, mounted on said base, for biasing said bolt toward a closed position relative to said hook portion;
    a second means, mounted on said base, for selectively preventing movement of said bolt out of said closed position, wherein said second means includes a pin mounted within a second opening in said handle portion and movable between a first position, outside both said first opening and a notch in said bolt, and a second position, inside both said first opening and said notch in said bolt.

16. The snap hook of claim 15, wherein said second means further includes a latch member connected to at least one end of said pin and disposed adjacent at least one side of said handle portion.

17. The snap hook of claim 16, wherein said first opening extends laterally through said one side of said handle portion, and said latch member covers said first opening on said one side of said handle portion.

18. The snap hook of claim 16, wherein said second opening extends laterally through said one side of said handle portion, and said latch member covers said second opening on said one side of said handle portion.

19. The snap hook of claim 16, wherein said second means further includes a helical coil spring extending generally perpendicular to said longitudinal axis and compressed between said latch member and said handle portion.

20. The snap hook of claim 16, wherein a first end of said latch member is connected to said pin, and an opposite, second end of said latch member is rotatably connected to said handle portion.

21. The snap hook of claim 20, wherein an intermediate portion of said latch member, rigidly interconnected between said first end and said second end, is configured to receive a user applied force.

22. The snap hook of claim 20, wherein an intermediate portion of said latch member, rigidly interconnected between said first end and said second end, is configured to receive a user applied force.

23. The snap hook of claim 16, wherein a first end of said latch member is connected to said pin, and an opposite, second end of said latch member is rotatably connected to said handle portion.

24. The snap hook of claim 15, wherein said first means is a helical coil spring axially aligned with said bolt and compressed between said bolt and said handle portion.

25. A snap hook, comprising:
    a base including a handle portion and a hook portion, wherein a T-shaped opening in the handle portion includes aligned first and second segments and an orthogonal third segment;
    a bolt having a longitudinal axis and movably mounted within said first and second segments;
    a first means, mounted on said base, for biasing said bolt toward a closed position relative to said hook portion, wherein said first means includes a helical coil spring disposed inside one of said first and second segments and compressed between said handle portion and said bolt; and
    a second means, mounted on said base, for selectively preventing movement of said bolt out of said closed position, wherein said second means includes a pin mounted inside said third segment and movable along said third segment and into engagement with a notch in said bolt.

26. The snap hook of claim 25, wherein said second means further includes a second spring which biases said pin toward said bolt.

27. The snap hook of claim 26, further comprising a force receiving member connected to said pin and configured to receive a user imposed force in opposition to said second spring.

28. The snap hook of claim 25, wherein said second means further includes a latch member connected to at least one end of said pin and disposed adjacent at least one side of said handle portion.

29. The snap hook of claim 28, wherein said T-shaped opening extends laterally through said one side of said handle portion, and said latch member covers said T-shaped opening on said one side of said handle portion.

30. The snap hook of claim 28, wherein said second means further includes a helical coil spring extending generally perpendicular to said longitudinal axis and compressed between said latch member and said handle portion.

31. A snap hook, comprising:
    a base including a handle portion and a hook portion;
    a bolt having a longitudinal axis and movably mounted to said handle portion;
    a first spring, interconnected between said bolt and said handle portion, and operable to urge said bolt axially outward from said handle portion, across a gap defined by said hook portion, and into an opening in a far end of said hook portion;
    a latch movably mounted to said handle portion, wherein said latch has side walls disposed outside opposite sides of said handle portion and a pin interconnected between said side walls; and
    a second spring, disposed between said side walls on said latch, interconnected between said latch and said handle portion, and operable to urge said pin into engagement with said bolt when said bolt occupies said opening in said far end of said hook portion, whereby a user must overcome forces exerted by said second spring and said first spring in order to remove said bolt from said far end of said hook.

32. The snap hook of claim 31, wherein said pin is disposed at a first end of said latch, and an opposite, second end of said latch is rotatably connected to said handle portion.

33. The snap hook of claim 31, wherein said bolt is disposed inside a slot which extends laterally through said handle portion, and said side walls span opposite sides of said slot.

34. The snap hook of claim 31, wherein said first spring is a helical coil spring axially aligned with said bolt and compressed between said bolt and said handle portion.

35. The snap hook of claim 31, wherein said second spring is a helical coil spring extending generally perpendicular to said longitudinal axis and compressed between said latch and said handle portion.

36. The snap hook of claim 35, wherein an intermediate portion of said latch, rigidly interconnected between said side walls, is configured to receive a user applied force.

37. The snap hook of claim 15, wherein said first means includes a helical coil spring compressed between said handle portion and said bolt.

* * * * *

UNITED STATES PATENT AND TRADEMARK OFFICE
CERTIFICATE OF CORRECTION

PATENT NO. : 6,070,308

DATED : June 6, 2000

INVENTOR(S) : Bradley A. Rohlf

It is certified that error appears in the above-identified patent and that said Letters Patent is hereby corrected as shown below:

Column 1, line 59, delete "and".

Column 1, line 63, delete "." and insert therefore --;--.

Column 2, line 19, delete "ir" and insert therefore --in--.

Column 4, line 44, delete "hock" and insert therefore --hook--.

Signed and Sealed this

Twenty-fourth Day of April, 2001

*Attest:*

NICHOLAS P. GODICI

*Attesting Officer*  *Acting Director of the United States Patent and Trademark Office*